(12) United States Patent
Yamaguchi et al.

(10) Patent No.: US 12,287,545 B2
(45) Date of Patent: Apr. 29, 2025

(54) BACKLIGHT MODULE AND DISPLAY APPARATUS WITH BACKLIGHT MODULE

(71) Applicant: WAYS ELECTRON CO., LTD., Jiangsu (CN)

(72) Inventors: Masaru Yamaguchi, Jiangsu (CN); Tomoya Mimura, Jiangsu (CN)

(73) Assignee: WAYS ELECTRON CO., LTD., Suzhou (CN)

( * ) Notice: Subject to any disclaimer, the term of this patent is extended or adjusted under 35 U.S.C. 154(b) by 0 days.

(21) Appl. No.: 18/533,170

(22) Filed: Dec. 8, 2023

(65) Prior Publication Data

US 2024/0103317 A1    Mar. 28, 2024

Related U.S. Application Data

(63) Continuation of application No. PCT/CN2023/113968, filed on Aug. 21, 2023.

(30) Foreign Application Priority Data

Jun. 23, 2022 (CN) .......................... 202210718833.6

(51) Int. Cl.
    *G02F 1/13357* (2006.01)

(52) U.S. Cl.
    CPC .. *G02F 1/133605* (2013.01); *G02F 1/133615* (2013.01)

(58) Field of Classification Search
    None
    See application file for complete search history.

(56) References Cited

U.S. PATENT DOCUMENTS

| | | | | |
|---|---|---|---|---|
| 2002/0039292 | A1* | 4/2002 | Matsui | G02F 1/133605 362/348 |
| 2012/0250293 | A1* | 10/2012 | Jeong | G02F 1/133615 362/97.1 |
| 2019/0049792 | A1* | 2/2019 | Chang Chien | G02F 1/133605 |
| 2022/0206339 | A1* | 6/2022 | Sun | G02F 1/133603 |
| 2023/0393432 | A1* | 12/2023 | Joseph | G02F 1/133605 |

FOREIGN PATENT DOCUMENTS

| | | | |
|---|---|---|---|
| CN | 215416195 U | * | 1/2022 |
| CN | 114153095 A | | 3/2022 |
| JP | 2001297613 A | | 10/2001 |
| JP | 2005010405 A | * | 1/2005 |

* cited by examiner

*Primary Examiner* — Shan Liu

(57) ABSTRACT

The present application discloses a backlight module and a display apparatus with the backlight module. The backlight module includes a substrate, a plurality of light sources, and a plurality of reflectors. The reflectors are arranged on the peripheries of the light sources. The surfaces, facing the light sources, of the reflectors are multi-stage curved surfaces. Light emitted from a side surface of the light source basically emits in the vertical direction after being adjusted by the multi-stage curved surface of the reflector, so as to collimate the light emitted from the light source, prevent the light emitted from the lighted light source on the periphery from irradiating an unlighted area nearby, and prevent light leakage. By using the reflector with this structure, in internal space formed in the reflector, the light in the internal space formed by each reflector is uniform, improving the optical grade of the display apparatus.

7 Claims, 8 Drawing Sheets

BACKLIGHT MODULE AND DISPLAY APPARATUS WITH BACKLIGHT MODULE

CROSS-REFERENCE TO RELATED APPLICATIONS

This application is a continuation of International Application No. PCT/CN2023/113968, filed on Aug. 21, 2023, which claims priority to Chinese Patent Application No. 202210718833.6, filed on Jun. 23, 2022. All of the aforementioned applications are incorporated herein by reference in their entireties.

TECHNICAL FIELD

The present application relates to the technical field of backlight modules, and in particular, to a direct type backlight module and a display apparatus with the backlight module.

BACKGROUND

On-board display and other fields have high requirement on contrast of a display apparatus. Due to the presence of light crosstalk between display areas of all sub-areas of a backlight module of an existing on-board display apparatus, originally dark areas are not dark enough due to the light emitted from light sources on peripheries, which reduces the contrast of the display apparatus, achieves a poor display effect of the display apparatus, and reduces user experience.

SUMMARY

In order to overcome the above defects, the present application provides a backlight module and a display apparatus with the backlight module, which cannot affect the optical grade of the display apparatus while improving the contrast of the display apparatus.

In order to solve technical problems of the present application, an adopted technical solution is that: embodiments of the present application provide a backlight module, including a substrate, configured with a bearing surface; a plurality of light sources, configured on the bearing surface; and a plurality of reflectors, positioned on the bearing surface of the substrate, and configured to surround the peripheries of all light sources. Surfaces, facing the light sources, of the reflectors are multi-stage curved surfaces.

As a further improvement of the present application, in a vertical direction from the bearing surface to a direction away from the bearing surface, distances L between a plurality of curved surfaces and a normal line of the light source sequentially increase on the whole.

As a further improvement of the present application, a surface, facing the light source, of each stage of curved surface is a concave cambered surface.

As a further improvement of the present application, a value of half of a radian of the concave cambered surface of each stage of curved surface is 10° to 25°; and half of the radian of the concave cambered surface is a degree of half of a circle center angle corresponding to an arc where the concave cambered surface is located.

As a further improvement of the present application, the concave cambered surface is a flat surface or a non-flat surface.

As a further improvement of the present application, the light sources are side light emitting-type light sources.

As a further improvement of the present application, the backlight module further includes: an optical film set, configured on one side, away from the bearing surface, of the reflector; and a shell, configured to bear the substrate and the optical film set.

As a further improvement of the present application, the surface, facing the light source, of the reflector is a three-stage curved surface.

As a further improvement of the present application, a distance between a vertex of the reflector and the optical film set is 0.1 to 2 mm.

According to another aspect of the present application, a display apparatus is further provided, which includes:
a display panel, and a backlight module as described above.

The present application has the beneficial effects that: the backlight module provided by the embodiments of the present application includes the substrate, the light sources, and the reflectors. The reflectors are arranged on the peripheries of the light sources. The surfaces, facing the light sources, of the reflectors are multi-stage curved surfaces. The light emitted from a side surface of the light source basically emits in the vertical direction after being adjusted by the reflector, so as to collimate the light emitted from each light source, prevent the light emitted from the lighted light source on the periphery from irradiating an unlighted area nearby, and prevent light leakage, thereby improving the contrast of the corresponding display apparatus. Meanwhile, by using the reflector with this structure, in internal space formed in the reflector, the light emitted from the light source is continuously reflected in an X direction and a Y direction, so that the light in the internal space formed by each reflector is uniform, thereby avoiding a problem that shadows appear at positions corresponding to the reflectors on the display apparatus when all light sources are lighted, improving the optical grade of the display apparatus, and improving user experience.

DETAILED DESCRIPTION OF THE EMBODIMENTS

Figure 1:
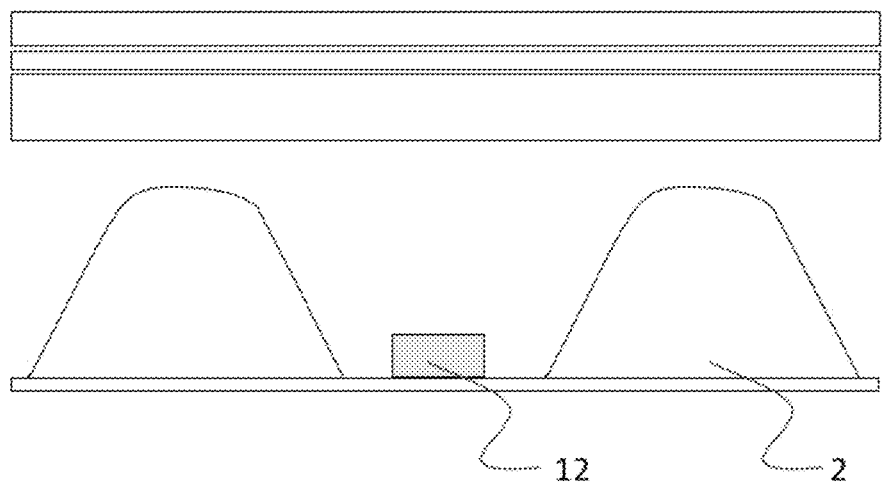
FIG. 1 is a schematic structural diagram of an existing backlight module.

Due to the presence of light crosstalk between display areas of all sub-areas of a backlight module of an existing on-board display apparatus, an originally dark area is not dark enough due to the light emitted from light sources on peripheries, which reduces contrast of a display apparatus, and achieves a poor display effect of the display apparatus. In order to solve this problem, a shelter is added between light sources of a backlight module in some display apparatuses. As shown in FIG. 1, which is a schematic structural diagram of an existing backlight module, a shelter 2 is arranged on the periphery of a light source 12. By adding the shelter, the light emitted from the lighted light source on the periphery can be prevented from irradiating an unlighted area nearby, so as to reduce the darkness of the unlighted area, thereby improving the contrast of the unlighted area. However, this solution produces another problem. When all light sources are lighted, shadows will appear at positions of the corresponding shelters on the display apparatus, which are easily identified on the display apparatus. Thus, the optical grade of the display apparatus will be reduced. For these problems above, the present application discloses a backlight module and a display apparatus with the backlight module, which can avoid the shadows on the display apparatus while improving the contrast, improve the optical grade of the display apparatus, and improve user experience.

A preferred embodiment of the present application is described below in detail in combination with the drawings.

Figure 2:
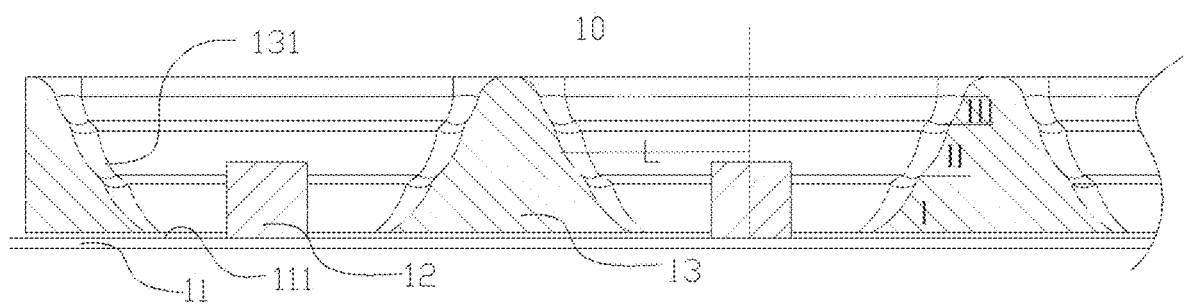
FIG. 2 is a schematic diagram of a sectional structure of the backlight module provided by one embodiment of the present application.
Figure 3:
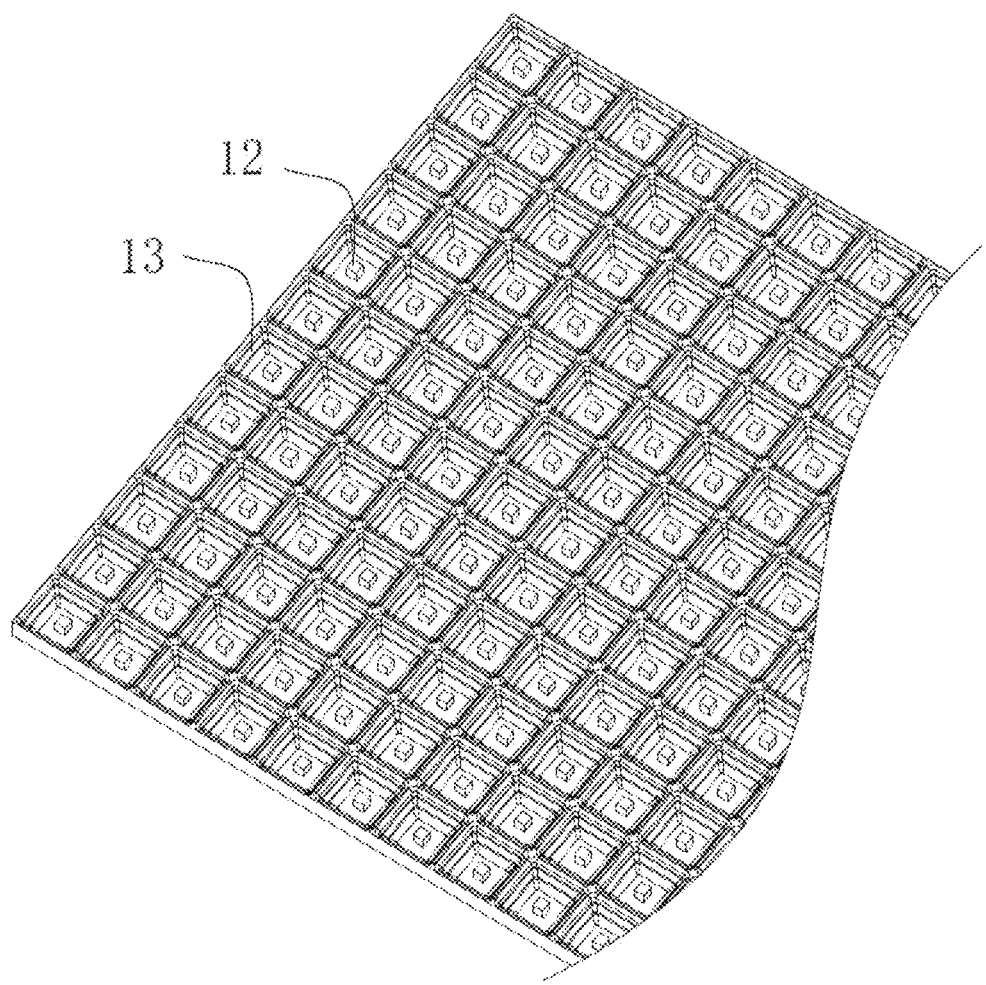
FIG. 3 is a schematic diagram of a partial structure of the backlight module provided by one embodiment of the present application.

FIG. 2 is a schematic diagram of a sectional structure of the backlight module provided by one embodiment of the present application. FIG. 3 is a schematic diagram of a partial structure of the backlight module provided by one embodiment of the present application. As shown in FIG. 2 and FIG. 3, in one embodiment of the present application, a backlight module 10 includes a substrate 11, a plurality of light sources 12, and a plurality of reflectors 13. The substrate 11 has a bearing surface 111. The plurality of light sources 12 are configured on the bearing surface 111 of the substrate 11. The plurality of reflectors 13 are positioned on the bearing surface 111, and are configured to surround the peripheries of all light sources 12. Surfaces 131, facing the light sources 12, of the reflectors 13 are multi-stage curved surfaces. It can be understood that each reflector 13 forms semi-enclosed space. The light source 12 is configured in the space. One reflector 13 surrounds one light source 12. According to the embodiment of the present application, the reflector 13 is arranged on the periphery of the light sources 12. The surface 131, facing the light source 12, of the reflector 13 is a multi-stage curved surface. The light emitted from a side surface of the light source 12 basically emits in a vertical direction after being adjusted by the reflector 13, so as to collimate the light emitted from each light source, prevent the light emitted from the lighted light source on the periphery from irradiating an unlighted area nearby, and prevent light leakage, thereby improving the contrast of the corresponding display apparatus.

In detail, referring to FIG. 2 again, in the vertical direction from the bearing surface 111 of the substrate 11 to a direction away from the bearing surface 111, distances L between a plurality of stages of curved surfaces and a normal line of the light source sequentially increase on the whole. That is, the surface 131, facing the light source 12, of the reflector 13 is inclined to a direction away from the normal line of the light source on the whole. For example, a first-stage curved surface close to the bearing surface 111 is referred to as a first-stage curved surface I, for example, a surface adjacent to the first-stage curved surface I upwards is referred to as a first-stage curved surface II, similarly, for example, a surface adjacent to the second-stage curved surface II upwards is referred to as a third-stage curved surface III, and so on. Thus, the first-stage curved surface I, the second-stage curved surface II, and the third-stage curved surface III are of annular structures that enclose the light source 12 and have certain widths. It can be understood that the distances L from the first-stage curved surface I, the second-stage curved surface II, and the third-stage curved surface III to the normal line of the light source sequentially increase on the whole. It can be understood that, for example, connections between the curved surfaces of different stages are not smooth. By using the reflector structure provided by embodiments of the present application, in an aspect, according to the law of reflection, the light emitted from the light source 12 to the reflector 13 on the periphery in a roughly horizontal direction may emit out in a roughly vertical direction after being reflected by an inner surface of the reflector 13, so as to prevent the light emitted from the lighted light source from irradiating an unlighted area nearby, and prevent light leakage. In another aspect, in internal space formed in the reflector 13, the light emitted from the light source 12 is continuously reflected in an X direction and a Y direction, so that the light in the internal space formed by each reflector 13 is uniform, thereby avoiding a problem that shadows appear at positions corresponding to the reflectors 13 on the display apparatus when all light sources are lighted.

Figure 4:
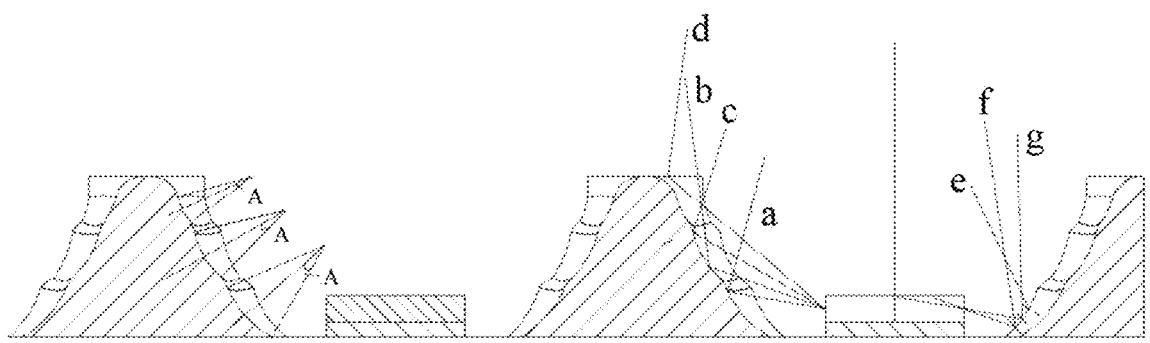
FIG. 4 is a schematic diagram of a light path direction of the backlight module provided by one embodiment of the present application.

Preferably, the surface, facing the light source, of each stage of curved surface is a concave cambered surface. A value of half of a radian of the concave cambered surface is 10° to 25°. Specifically, half of the radian of the concave cambered surface here refers to a degree of half of a circle center angle corresponding to an arc where the concave cambered surface is located, for example, the degree of angle A in FIG. 4. FIG. 4 is a schematic diagram of a light path direction of the backlight module provided by one embodiment of the present application. As shown in FIG. 4, the light emitted from the light source 12, for example, light a, light b, light c, light d, light e, light f, and light g, basically emits out in a vertical direction after being reflected by the inner surface of the reflector 13 (the surface facing the light source), so as to prevent the light emitted from the lighted light source on the periphery from irradiating an unlighted area nearby.

Figure 5A:
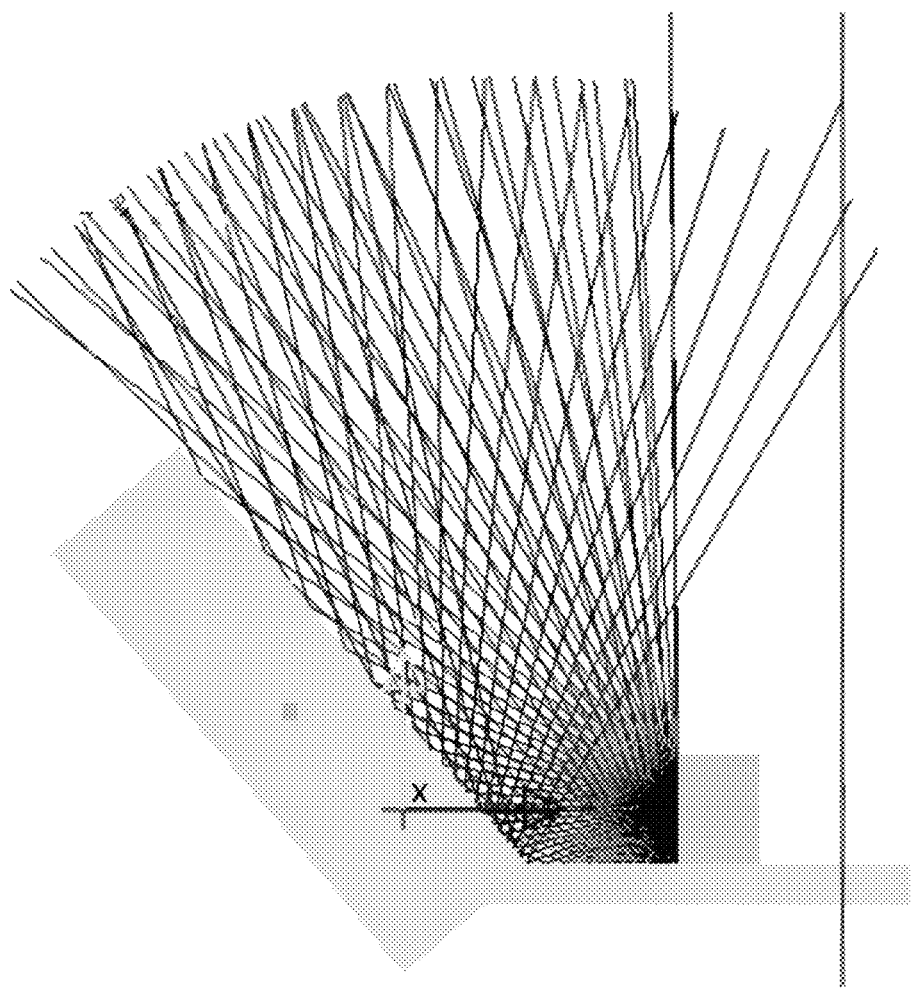
FIG. 5a to FIG. 5d are some optical simulation results obtained for different surface shapes, facing light sources, of reflectors.
Figure 5B:
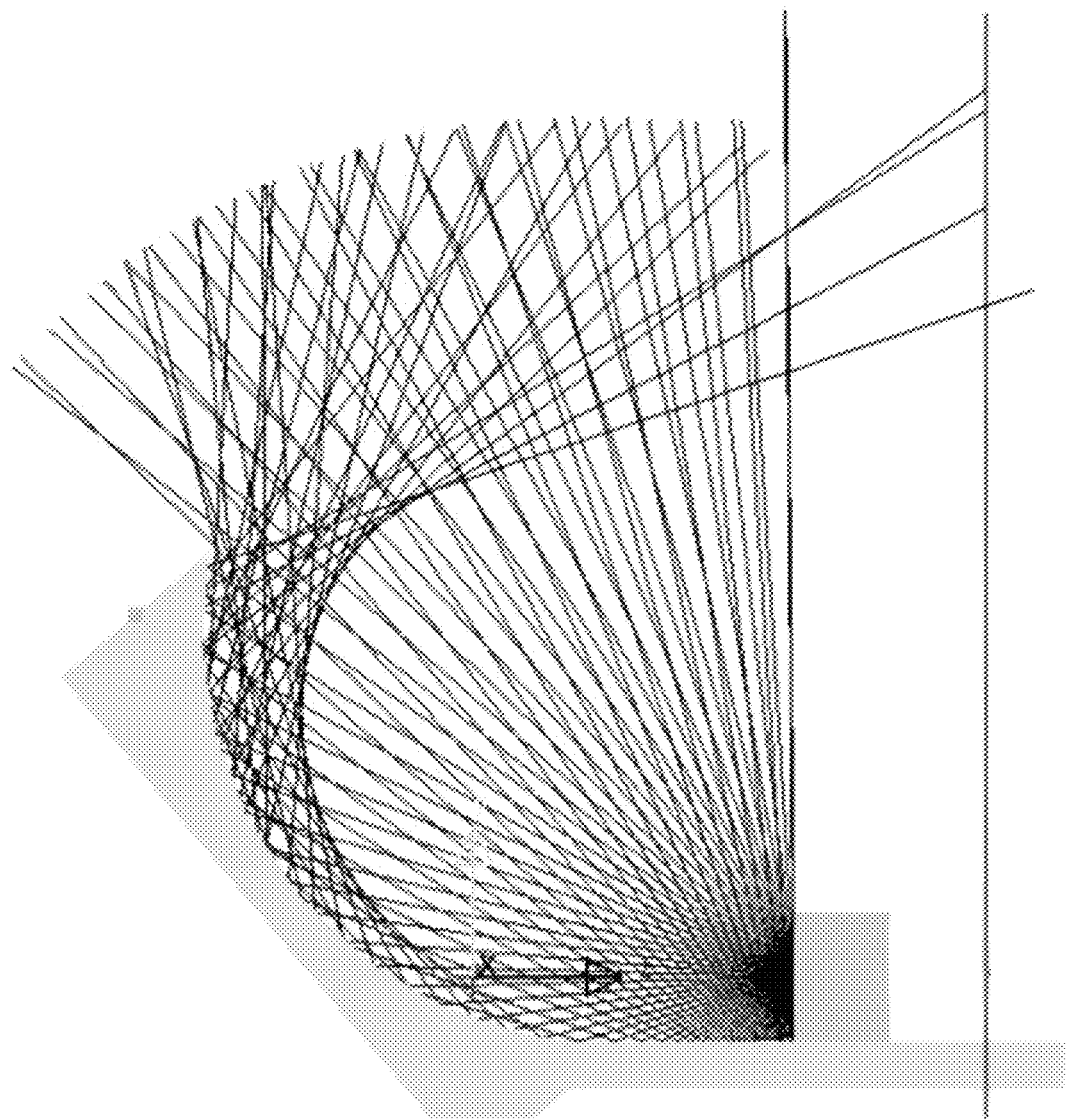
Figure 5C:
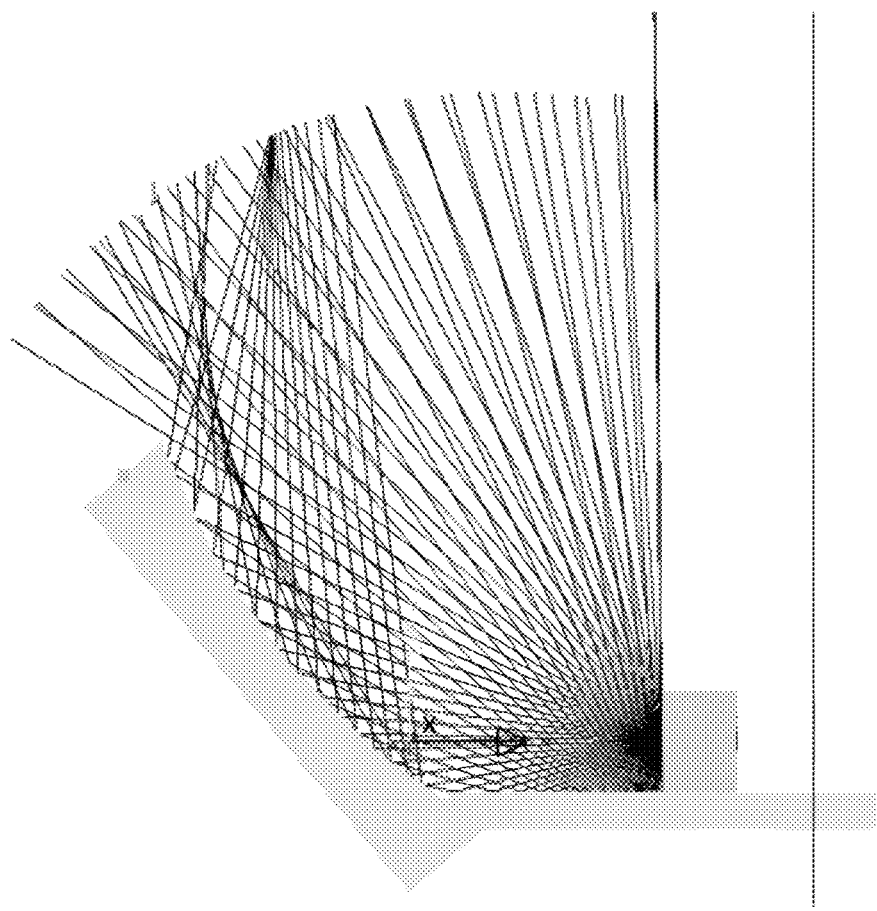
Figure 5D:
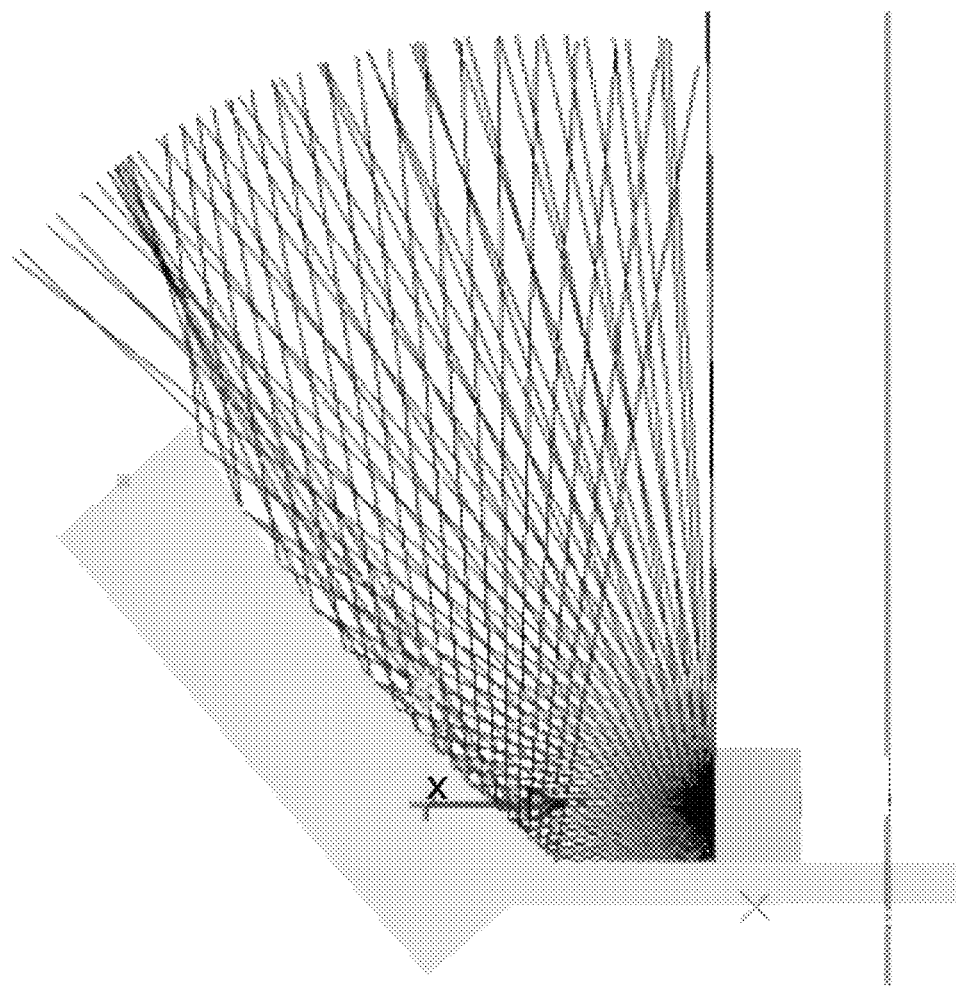

In order to verify that different shapes of surfaces, facing the light source, of the reflector have different adjusting effects on the light of the light source, a series of optical simulations are performed in the present application, and simulation results are shown in FIG. 5a to FIG. 5d. FIG. 5a shows a simulation result when the surface, facing the light source, of the reflector is a plane. FIG. 5b shows a simulation result when the surface, facing the light source, of the reflector is a concave cambered surface, and half of the radian of the concave cambered surface is 40°. FIG. 5c shows a simulation result when the surface, facing the light source, of the reflector is a concave cambered surface, and half of the radian of the concave cambered surface is 20°. FIG. 5d shows a simulation result when the surface, facing the light source, of the reflector is a concave cambered surface, and half of the radian of the concave cambered surface is 10°. From the above simulation results, it can be known that when the face, facing the light source, of the reflector is a plane, and when the light emitted from the light source emits to the surface, facing the light source, of the reflector, according to the law of reflection, the light will be emitted out from another side of the normal line at the same angle, an effect that the light emitted from the light source emits out from a vertical direction after an adjusting effect of the reflector cannot be completely achieved, and the light is uncontrollable, which is not conducive to partitioned control. In addition, the light emitted from a side surface of the light source is not fully utilized, which will cause a luminance loss. If the radian of the concave cambered surface is large, for example, half of the radian of the cambered surface is 40°, the optical simulation result is shown in FIG. 5b. The light emitted from the light source will emit out towards a direction of the light source, and an effect that the light emitted from the light source emits out from a vertical direction after an adjusting effect of the reflector can also not be completely achieved. When the value of the radian of the concave cambered surface is appropriate, for example, half of the radian of the concave cambered surface is 20°, an optical simulation result is shown in FIG. 5c. The light emitted from the light almost completely emits out in the vertical direction after the adjusting effect of the reflector, and the light emitted out from the light source is fully utilized. There will be no luminance loss. Exit angles of the light are roughly the same, which is conducive to partitioned control. FIG. 5d shows a simulation result when half of the radian of the concave cambered surface is 10°. From the simulation result, it can be seen that when the value of half of the radian of the concave cambered surface is appropriate, for example, half of the radian of the concave cambered surface is 10°, the light emitted from the light also almost completely emits out in the vertical direction after the adjusting effect of the reflector, which will not cause a luminance loss, and is conducive to partitioned control. Therefore, preferably, in the multi-stage curved surface of the surface, facing the light source, of the reflector, the value of half of the radian of the concave cambered surface of each stage of curved surface is between 10° and 25°.

Further, the concave cambered surface may be a roughly flat surface, for example, a quasi-mirror reflection roughly occurs when light emits to the cambered surface. Preferably, the concave cambered surface may also be non-flat, for example, a frosted or gnawing surface. A quasi-diffuse reflection occurs when the light emits to the non-flat cambered surface, so that the light is more uniform in the internal space formed by the reflector.

Referring to FIG. 2 and FIG. 3 again, the light sources 12 are configured on the bearing surface 111 of the substrate 11, and are positioned in the internal spaced formed by the reflectors 13. In one embodiment, the plurality of light sources 12 are arranged in the bearing surface 111 in an array, correspondingly, the reflectors 13 are configured on the bearing surface 111 of the substrate 11 in one-to-one correspondence with the light sources 12, and surround the peripheries of the light sources 12. For example, the light sources 12 are side light emitting-type Light Emitting Diodes (LEDs). The side light emitting-type LED may emit light to the periphery, so that the light is more easily dispersed uniformly in the internal space formed by reflectors 13. When all light sources are lighted, shadows appearing at positions corresponding to the reflectors 13 on the display apparatus are reduced, thereby improving the optical grade of the display apparatus. Of course, it is not limited to this. The light sources may also be other types of light sources that can emit to side surfaces.

Figure 6:
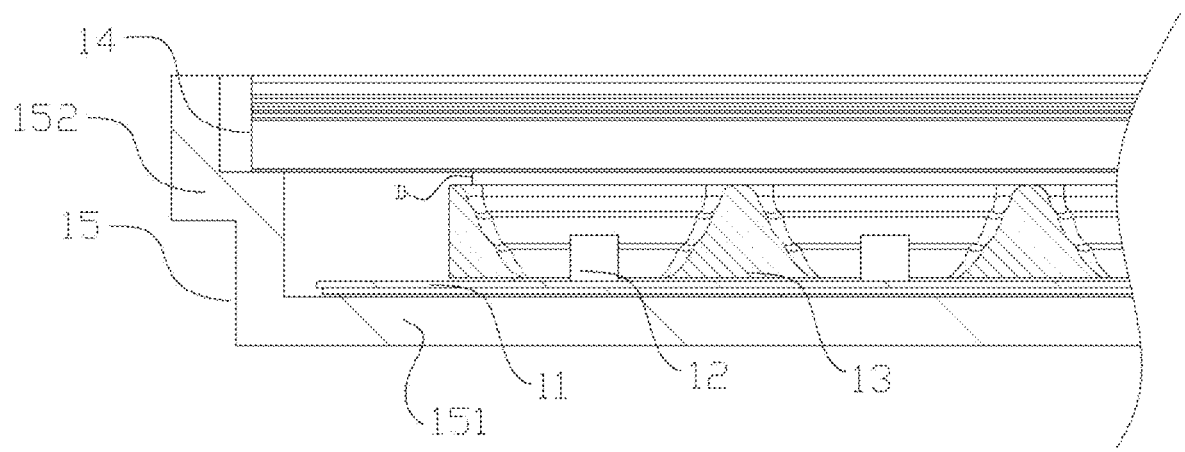
FIG. 6 is a schematic structural diagram of the backlight module provided by another embodiment of the present application.

FIG. 6 is a schematic structural diagram of a backlight module 10 provided by another embodiment of the present application. As shown in FIG. 6, the backlight module 10 further includes an optical film set 14, configured on one side, away from the bearing surface 111, of the reflector 13; and a shell 15, configured to bear the substrate 11 and the optical film set 14. Specifically, for example, the optical film set 14 includes optical films, such as a diffusion sheet, a dispersion sheet, and a prism sheet, which are configured to uniformize the light emitted from the light source. For example, the shell 15 includes a base substrate 151 and a side wall 152. The substrate 11 is positioned on the base substrate 151. The side wall 152 protrudes to an inner cavity of the shell 15 to form a step for supporting the optical film set 14. Due to such arrangement, the reflector 13 and the light source 12 are positioned in enclosed space formed by the shell 15 and the optical film set 14. Specifically, the surface, facing the light source 12, of the reflector 13 is a three-stage surface. In a vertical direction from the bearing surface 111 of the substrate 11 to a direction away from the bearing surface 111, distances from the three stages of curved surfaces to the normal line of the light source sequentially increase on the whole. A highest point of the reflector 13 from the bearing surface 111 of the substrate 11 is called a vertex. In one embodiment of the present application, a distance D between the vertex of the reflector 13 and the optical film set 14 is 0.1 to 2 mm.

Figure 7A:
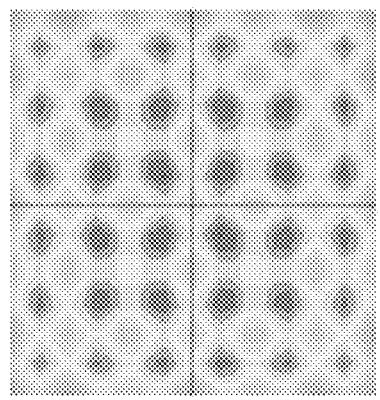
FIG. 7a, FIG. 7b, and FIG. 7c are respectively the optical simulation results of the backlight module provided by the embodiment of the present application, a backlight module using a shelter of an existing design, and a backlight module not using a reflector in when all light sources are lighted.
Figure 7B:
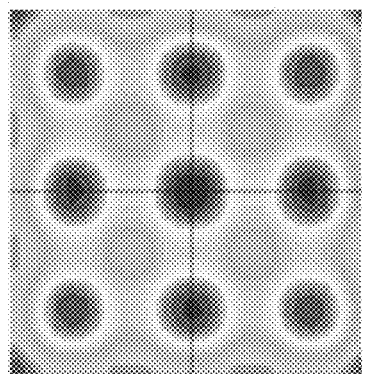
Figure 7C:
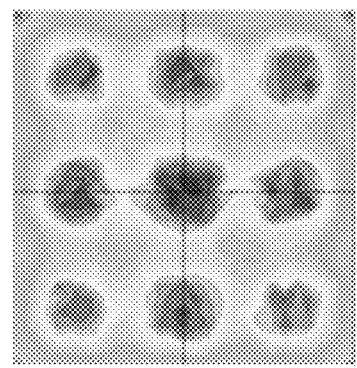

In order to verify the optical effect of the backlight module provided by the embodiment of the present application when all light sources are lighted, the following optical simulation is performed. FIG. 7a is a simulation effect diagram of a luminance deviation between brightness and darkness of the backlight module using the reflector provided by the embodiment of the present application when all light sources are lighted. Specifically, the luminance deviation between the brightness and the darkness of the backlight module using the reflector provided by the embodiment of the present application is 65%. FIG. 7b is a simulation effect diagram of the luminance deviation between the brightness and the darkness of the backlight module using a general shelter when all light sources are lighted. The luminance deviation between the brightness and the darkness of the backlight module using the general shelter is 31%. FIG. 7c is a simulation effect diagram of the luminance deviation between the brightness and the darkness of the backlight module not using a reflector when all light sources are lighted. The luminance deviation between the brightness and the darkness of the backlight module not using the reflector is 34%. The luminance deviation between the brightness and the darkness here refers to a percentage of a darkest area to a brightest area when all light sources are lighted. The larger the numerical value of the percentage, the smaller the deviation between the brightness and the darkness, and the better the quality of an image. From the above simulation results, it can be seen that the backlight module using the reflector provided by the embodiment of the present application has the smallest deviation between the brightness and the darkness. Therefore, correspondingly, a good image quality is displayed.

Figure 8A:
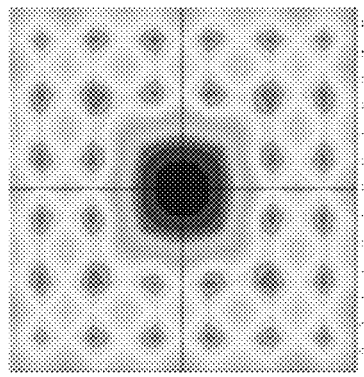
FIG. 8a, FIG. 8b, and FIG. 8c are respectively the optical simulation results of the backlight module provided by the embodiment of the present application, a backlight module using a shelter of an existing design, and a backlight module not using a reflector when all light sources are lighted.
Figure 8B:
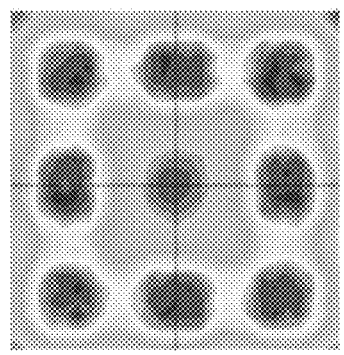
Figure 8C:
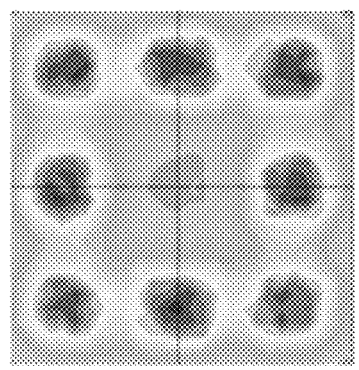

In order to verify the optical effect of the backlight module provided by the embodiment of the present application when part light sources are lighted, the following optical simulation is performed. FIG. 8a is a simulation effect diagram of a luminance deviation between light and dark of the backlight module using the reflector provided by the embodiment of the present application when a central light source is unlighted. Specifically, the luminance deviation between the brightness and the darkness of the backlight module using the reflector provided by the embodiment of the present application is 4%. FIG. 8b is a simulation effect diagram of the luminance deviation between the brightness and the darkness of the backlight module using a general shelter when the central light source is unlighted. The luminance deviation between the brightness and the darkness of the backlight module using the general shelter is 11.1%. FIG. 8c is a simulation effect diagram of the luminance deviation between the brightness and the darkness of the backlight module not using a reflector when the central light source is unlighted. The luminance deviation between the brightness and the darkness of the backlight module not using the reflector is 19.5%. The luminance deviation between the brightness and the darkness here refers to a percentage of a darkest area to a brightest area when the central light source is unlighted. The smaller the numerical value of the percentage, the less light leakage occurs, and correspondingly, the better the quality of an image. From the above simulation results, it can be seen that the backlight module using the reflector provided by the embodiment of the present application has the smallest deviation between the brightness and the darkness, which indicates that the light emitted from the lighted light source on the periphery is better prevented from irradiating an unlighted area nearby by using the reflector structure provided by the embodiment of the present application, thereby improving the contrast of the corresponding display apparatus.

According to another aspect of the present application, a display apparatus is provided. The display apparatus includes a display panel and the backlight module as described in the foregoing. For example, the display panel is a Liquid Crystal Display (LCD) panel. For example, the display apparatus is applied to on-board fields. The reflector is arranged in the backlight module, so as to prevent the light emitted from the lighted light source on the periphery in the backlight module from irradiating the unlighted area nearby and prevent light leakage, thereby improving the contrast of the corresponding display apparatus, and meeting the requirement of an on-board display apparatus on display performance.

Many specific details are described in the above description to facilitate a full understanding of the present application. However, the above description is only a preferred embodiment of the present application. The present application can be implemented in many other ways different from the ones described here. Therefore, the present application is not limited by the specific implementation disclosed above. Meanwhile, any person skilled in the art can make many possible changes and modifications to the technical solution of the present application by using the methods and technical content disclosed above, or amend it into equivalent embodiments of equivalent changes without departing from the scope of the technical solution of the present application. Any simple amendments, equivalent changes and modifications that do not deviate from the technical solutions of the present application and are made to the above embodiments based on the technical essence of the present application are still within the scope of protection of the technical solutions of the present application.

What is claimed is:

1. A backlight module, comprising:
 a substrate, configured with a bearing surface;
 a plurality of light sources, configured on the bearing surface;
 a plurality of reflectors, positioned on the bearing surface of the substrate, and configured to surround the peripheries of all light sources, wherein
 surfaces, facing the light sources, of the reflectors are multi-stage curved surfaces,
 wherein in a vertical direction from the bearing surface to a direction away from the bearing surface, distances L between a plurality of stages of curved surfaces and a normal line of each of the light sources sequentially increase on the whole,
 wherein each of the surfaces of the reflectors, facing each of the light sources, of each stage of curved surface is a concave cambered surface,
 wherein a half of a radian of the concave cambered surface is a half of a center angle of a circle having an arc where the concave cambered surface is located, wherein the half of the center angle ranges from 10° to 25°, ensuring that the concave cambered surface is optimized to control a direction and uniform distribution of reflected light efficiently.

2. The backlight module according to claim 1, wherein the concave cambered surface is a flat surface or a non-flat surface.

3. The backlight module according to claim 1, wherein the light sources are side light emitting-type light sources.

4. The backlight module according to claim 1, further comprising:
 an optical film set, configured on one side, away from the bearing surface, of the reflector; and
 a shell, configured to bear the substrate and the optical film set.

5. The backlight module according to claim 4, wherein the surface, facing the light source, of the reflector is a three-stage curved surface.

6. The backlight module according to claim 4, wherein a distance between a vertex of the reflector and the optical film set is 0.1 to 2 mm.

7. A display apparatus, comprising:
 a display panel; and
 the backlight module according to claim 1.

* * * * *